(12) United States Patent
Chow

(10) Patent No.: US 11,201,960 B2
(45) Date of Patent: Dec. 14, 2021

(54) MESSAGE SENDING METHOD AND PROCESSING DEVICE

(71) Applicant: Alibaba Group Holding Limited, Grand Cayman (KY)

(72) Inventor: Ming Hon Chow, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/805,572

(22) Filed: Feb. 28, 2020

(65) Prior Publication Data

US 2020/0204675 A1    Jun. 25, 2020

Related U.S. Application Data

(63) Continuation of application No. PCT/CN2018/101651, filed on Aug. 22, 2018.

(30) Foreign Application Priority Data

Aug. 29, 2017    (CN) .......................... 201710756207.5

(51) Int. Cl.
*H04M 1/7243* (2021.01)
*H04W 4/12* (2009.01)
*H04M 1/72451* (2021.01)

(52) U.S. Cl.
CPC ..... *H04M 1/7243* (2021.01); *H04M 1/72451* (2021.01); *H04W 4/12* (2013.01)

(58) Field of Classification Search
CPC ......... H04M 2250/22; H04M 1/72552; H04M 1/72583; H04M 1/72522; H04M 1/72566; H04M 1/72547; H04M 2250/52; H04W 4/023; H04W 4/12; H04W 4/20; H04W 4/35; H04W 4/38; H04W 52/0229
See application file for complete search history.

(56) References Cited

U.S. PATENT DOCUMENTS

| | | | |
|---|---|---|---|
| 2015/0096042 A1* | 4/2015 | Mizrachi | ................. H04L 51/34 726/26 |
| 2016/0344720 A1* | 11/2016 | Nayak | ..................... H04L 51/32 |
| 2018/0196588 A1* | 7/2018 | Wang | .................. G06F 3/04817 |

FOREIGN PATENT DOCUMENTS

| | | | | |
|---|---|---|---|---|
| CN | 103379451 | | 10/2013 | |
| CN | 105791105 | | 7/2016 | |
| CN | 105867731 A | * | 8/2016 | |
| EP | 2685701 A1 | * | 1/2014 | ........ H04M 1/72547 |
| WO | 2017113076 | | 7/2017 | |

* cited by examiner

*Primary Examiner* — Yuwen Pan
*Assistant Examiner* — Jing Gao

(57) ABSTRACT

The present disclosure provides a message sending method and a processing device. The method comprises: detecting a trigger duration of a send key; determining a valid duration of a to-be-sent object according to the trigger duration; and sending the to-be-sent object to a receiver, wherein the valid duration is used for destroying the to-be-sent object from the receiver when a view duration of the to-be-sent object by the receiver is greater than or equal to the valid duration. This solution solves the technical problem of poor user experience caused by the existing overly cumbersome secret message sending process, thereby achieving the technical effect of easily and efficiently sending secret messages.

21 Claims, 17 Drawing Sheets

MESSAGE SENDING METHOD AND PROCESSING DEVICE

The present application is a Continuation application of, and claims priority to, International Patent Application PCT/CN2018/101651, filed on Aug. 22, 2018, which claims priority to Chinese Patent Application No. 201710756207.5, filed on Aug. 29, 2017 and entitled "MESSAGE SENDING METHOD AND PROCESSING DEVICE," which applications are incorporated herein by reference in their entirety.

TECHNICAL FIELD

The present invention relates to the field of Internet technologies, and in particular, to a message sending method and a processing device.

BACKGROUND

With the continuous development of Internet technologies and mobile terminal devices, more and more people communicate through communication software on devices such as mobile phones. During message transfer, it is inevitable to have situations where both parties desire that a valid message will be known only to them after being sent, and preferably, that the message can automatically disappear in the terminal devices of both parties. That is, it is hoped that the sent message can achieve the "Burn After Reading" effect.

However, current methods for sending burn-after-reading messages (namely, secret messages) generally require a sender to enter into an independent secret message sending interface or function, and the valid time of messages is generally preset by the system. Such aspects result in cumbersome implementation and poor user experience.

No effective solution has been proposed at present with regards to the aforementioned problem.

SUMMARY

Embodiments of the present invention provide a message sending method and a processing device, so as to achieve the technical effect of easily and efficiently sending secret messages.

A message sending method, comprising: detecting a trigger duration of a send key; determining a valid duration of a to-be-sent object according to the trigger duration; and sending the to-be-sent object to a receiver, wherein the valid duration is used for destroying the to-be-sent object from the receiver when a view duration of the to-be-sent object by the receiver is greater than or equal to the valid duration.

A message sending method, comprising: sending a data object to a receiver; and detecting a trigger operation of a sender on the sent object to obtain a valid duration of the data object, wherein the valid duration is used for destroying the data object from the receiver when a view duration of the data object by the receiver is greater than or equal to the valid duration.

A processing device comprises a processor and a memory configured to store processor-executable instructions, wherein when executing the instructions, the processor implements: detecting a trigger duration of a send key; determining a valid duration of a to-be-sent object according to the trigger duration; and sending the to-be-sent object to a receiver, wherein the valid duration is used for destroying the to-be-sent object from the receiver when a view duration of the to-be-sent object by the receiver is greater than or equal to the valid duration.

A processing device comprises a processor and a memory configured to store processor-executable instructions, wherein when executing the instructions, the processor implements: sending a data object to a receiver; and detecting a trigger operation of a sender on the sent object to obtain a valid duration of the data object, wherein the valid duration is used for destroying the data object from the receiver when a view duration of the data object by the receiver is greater than or equal to the valid duration.

A computer-readable storage medium has computer instructions stored thereon, wherein when executed, the instructions implement the steps of the method described above.

In the embodiments of the present invention, a valid duration of a secret message can be determined through a trigger duration of a send key by a sender, so as to send the secret message and make it unnecessary for the sender to enter into a special secret message sending interface to send the secret message, thereby achieving simple implementation. The technical problem of poor user experience caused by the existing overly cumbersome secret message sending process is solved in the above manner, thereby achieving the technical effect of easily and efficiently sending secret messages.

BRIEF DESCRIPTION OF THE DRAWINGS

The accompanying drawings described herein are used for providing further understanding of the present invention and constitute a part of the present application, rather than constituting a limitation to the present invention. In the accompanying drawings.

DETAILED DESCRIPTION

In order to make the objectives, technical solutions, and advantages of the present invention more comprehensible, the present invention is further described in detail below through embodiments with reference to the accompanying drawings. Herein, the schematic embodiments of the present invention and description thereof serve to explain the present invention rather than to limit the present invention.

Figure 1:
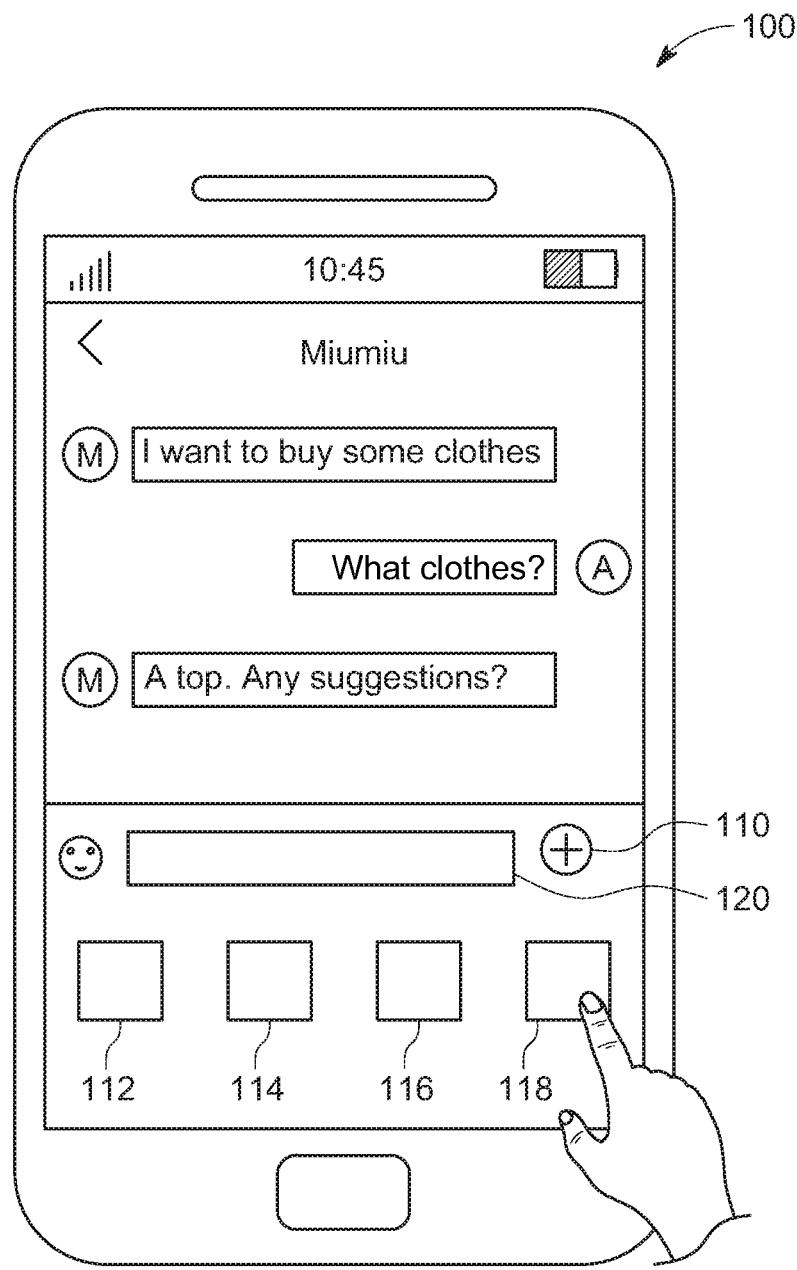
FIG. 1 is a diagram of a smart phone with a trigger interface 100 for existing secret message sending.

FIG. 1 is a diagram of a smart phone with a trigger interface 100 of an existing secret message sending method. That is, the message sending interface 100 is provided with a "Secret Message" option that a user needs to trigger so as to enter into a secret message sending function first when deciding to send a secret message. The content input by the user is sent in a secret message (Burn After Reading) mode only after the secret message sending function is enabled. Specifically, the entire sending process of a secret message may include: the user clicks "+" option 110 to enter into an option interface that has a photo option 112, a camera option 114, a short video option 116, and a secret message option 118. The user then selects "Secret Message" option 118. Next, the user inputs content to be sent in a message sending box 120 of a displayed interface and clicks Send, and then the content is sent in a secret message mode. After a receiver receives and reads the secret message content, the secret message content will automatically disappear after a predetermined duration.

Thus, in the existing secret message sending method, the user needs to enter into a function selection interface to perform selection so as to send a secret message, resulting in cumbersome operation. In this example, consider the following: if a control key is set on a normal message sending interface and control rights as to whether to trigger secret message sending are set in the "control key," then the sending user does not need to enter into the function selection interface, but only needs to trigger the "control key" to send a "secret message."

Figure 2:
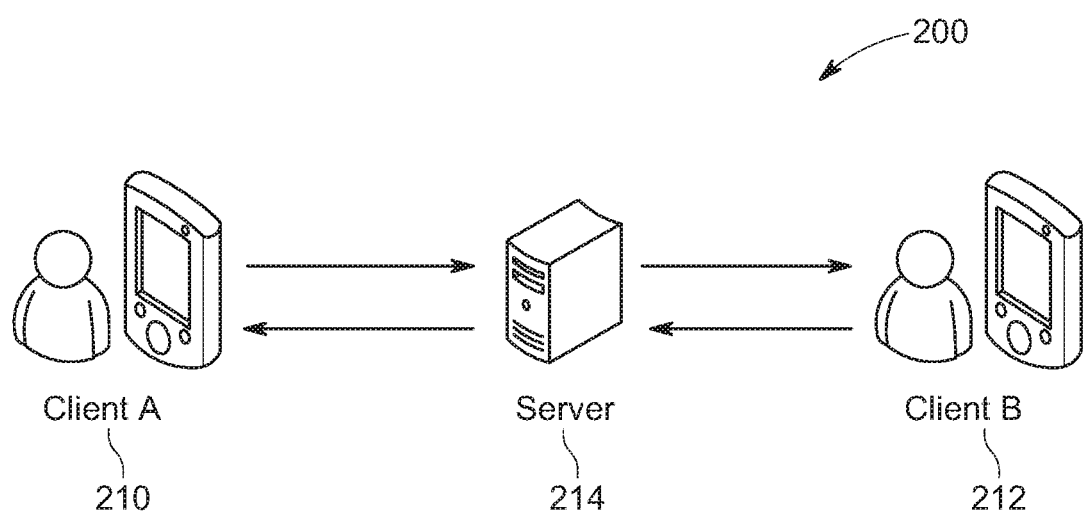
FIG. 2 is a diagram illustrating an example of a message sending system 200 according to an embodiment of the present invention.

FIG. 2 shows a diagram that illustrates an example of a message sending system 200 in accordance with the present invention. As shown in FIG. 2, the system 200 may include clients and a server, including a client A 210, a client B 212, and a server 214. Client A can send a message to and receive a message from client B 212. Similarly, client B 212 can also send a message to and receive a message from client A 210, thereby achieving message exchange. Server 214, in turn, can be used to transfer messages between client A 210 and client B 212.

In one embodiment, the client may be a terminal device or software used and operated by a customer. Specifically, the client may be a terminal device such as a smart phone, a tablet computer, a notebook computer, a desktop computer, a smart watch or other wearable devices. Certainly, the client may also be software capable of running in the aforementioned terminal device. For example, application software for music playback, video playback, or the like. A message sender can transfer messages through communication software on the terminal device, and a message receiver can also receive messages through communication software on the terminal device.

In one embodiment, the aforementioned server may be a single server device, or a server cluster, or a cloud server, or the like. The specific manner to be adopted may be selected according to actual needs and is not limited in the present application.

With consideration to the limited space on the message interface, a trigger key may be separately set as a control key, or the control key may be combined with a send key into one key. The space of the message interface can be effectively saved by combining the control key and the send key into one key.

Figure 3:
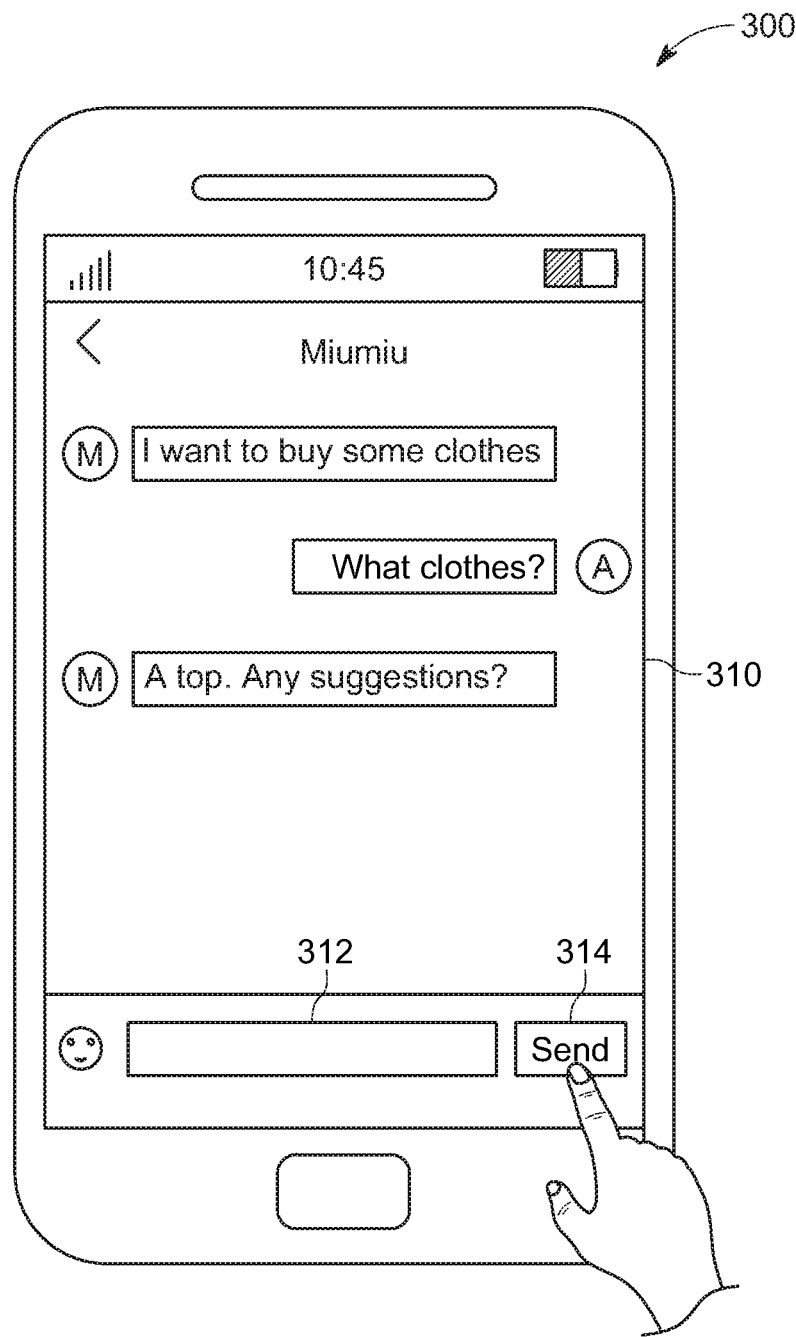
FIG. 3 is a diagram illustrating an example of a smart phone with a trigger interface 300 for secret message sending according to an embodiment of the present invention.

FIG. 3 shows a diagram that illustrates an example of a smart phone with a trigger interface 300 in accordance with the present invention. As shown in FIG. 3, interface 300, which can be implemented on the clients, such as client A 210 and client B 212, includes a current dialog box 310, which displays the most recent sent and received messages from a specific person or group, an input box 312, which provides a location for a new message to be input, and a "send" button or key 314. As shown in FIG. 3, existing message send key 314 is also used as a send key for secret messages. The send key 314 can be used to confirm a valid duration of a secret message, so that the user can send a secret message without entering into a function selection interface and, at the same time, keep the existing message interface intact, thereby reducing changes to the interface and improving the sending efficiency of secret messages. Specifically, different control instructions may be generated through trigger durations of the send key 314 by the user. That is, it may be determined, through different trigger durations, whether to send in a normal message mode or to send in a secret message mode. Moreover, different valid durations may be determined according to different trigger durations.

Figure 4:
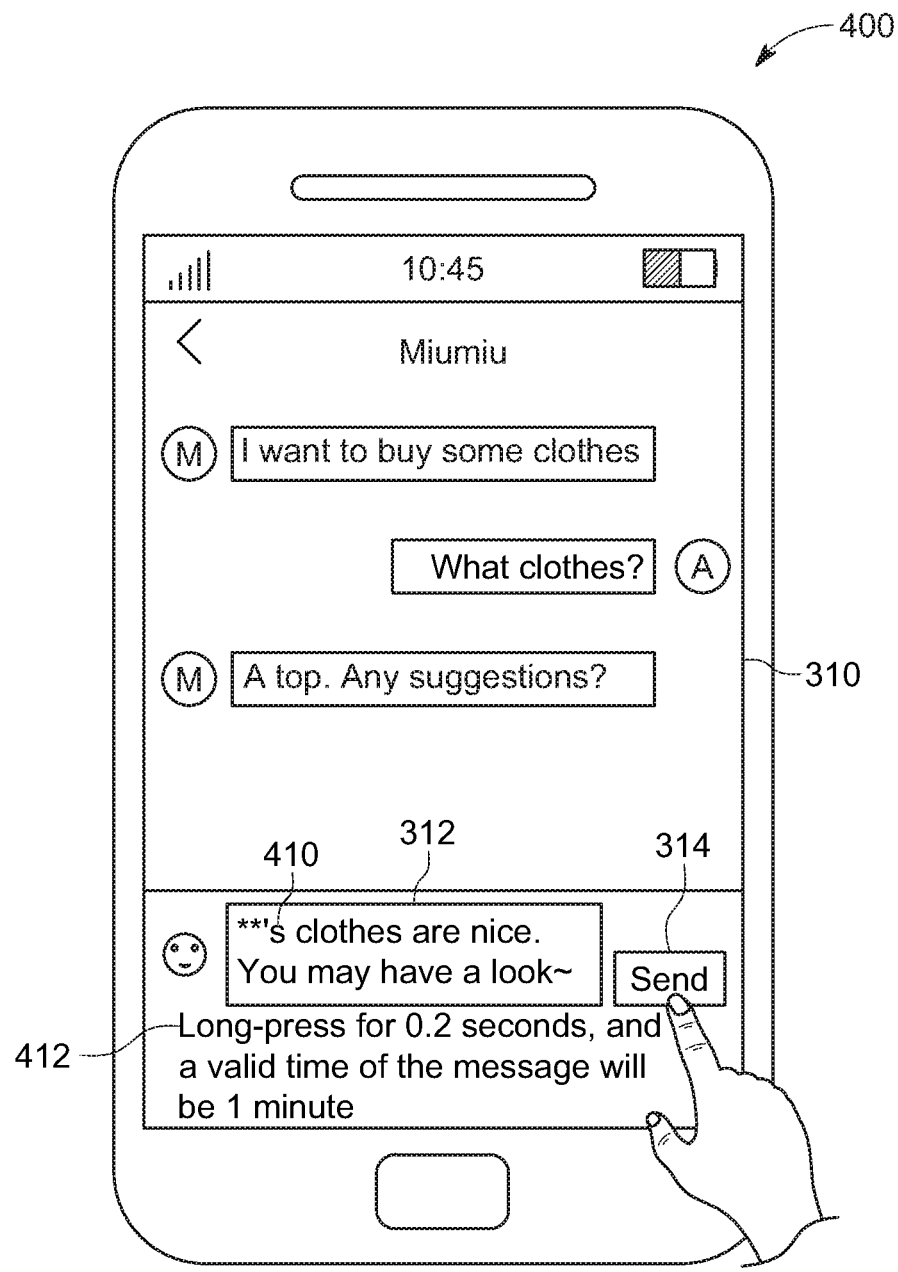
FIG. 4 is a diagram illustrating an example of a smart phone with a trigger interface 400 for secret message sending according to an embodiment of the present invention.
Figure 5:
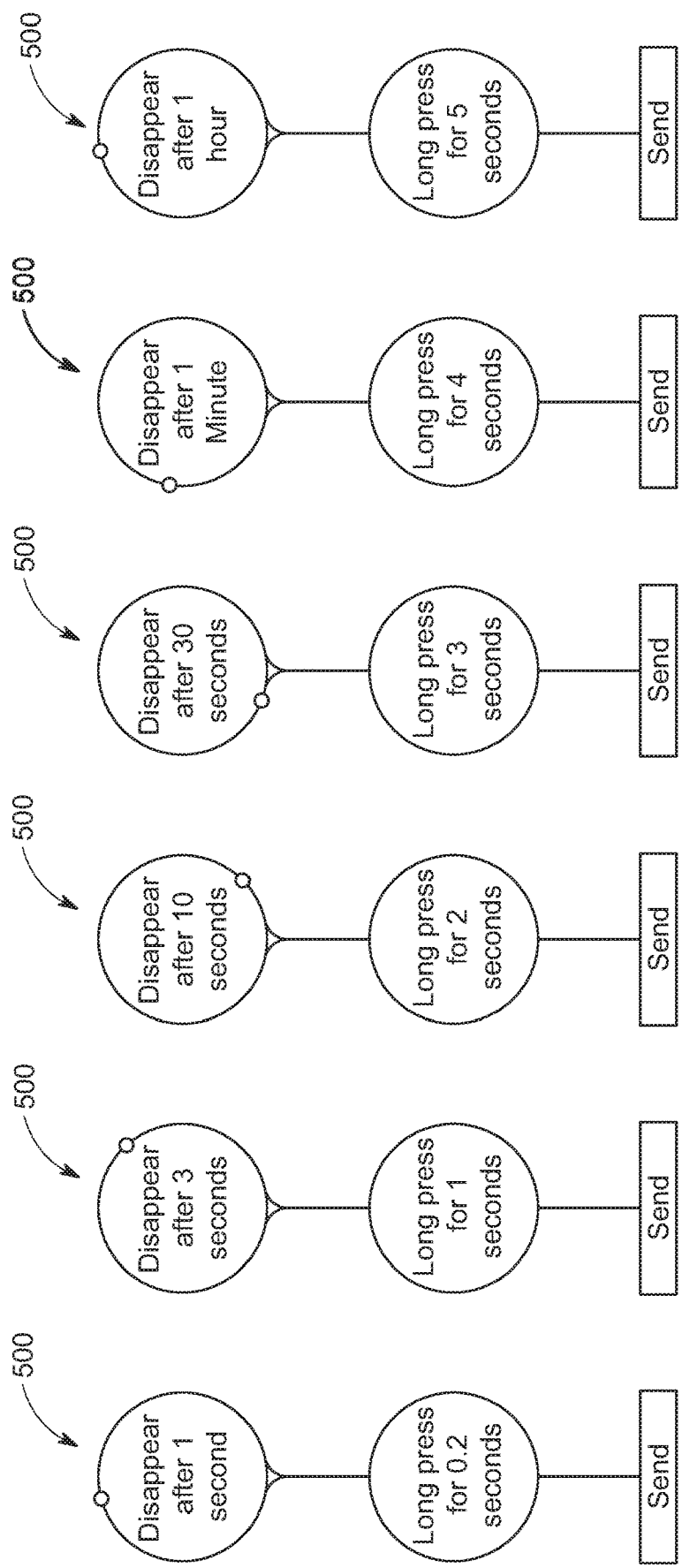
FIGS. 5A-5F are diagrams illustrating an example of a series of long-press times 500 according to an embodiment of the present invention.

FIG. 4 shows a diagram that illustrates an example of a smart phone with a trigger interface 400 in accordance with the present invention. Interface 400 is similar to interface 300 and, as a result, utilizes the same reference numerals to designate the structures that are common to both interfaces. As shown in FIG. 4, trigger interface 400 differs from interface 300 in that interface 400 shows a message 410 in input box 312. In one embodiment, as shown in FIG. 4, different control instructions can be generated through different trigger durations (which may be durations that the user long-presses the send key 314). For example, if the user clicks only once and does not perform any long-press operation, then message content in input box 312 may be sent in a normal non-secret message mode. If the user long-presses the control key 314, then sending of the message in the input box 312 in a secret message mode may be triggered. Further, it may be set that different secret message valid durations are generated according to different long-press times of the user. For example, if the long-press time of the user is 2 seconds, then a valid duration of 10 minutes for the message in the input box 312 may be triggered. If the long-press time is 1 second, then the corresponding valid duration is 1 minute.

In implementation, it may be set that secret messages correspond to only one valid duration (for example, 1 minute), or it may be set that secret messages correspond to a plurality of valid durations (for example, 1 minute, 10 minutes, and 1 hour). In other words, different valid durations may correspond to different long-press times.

FIGS. 5A-5F show diagrams that illustrate examples of a series of long-press times 500 in accordance with the present invention. As shown in FIGS. 5A-5F, when the trigger is the send key and the user holds the send key for one of a number of durations, the machine system feedback responds by destroying a secret message after a time that corresponds with the duration that the user held the send key. Thus, different long-press times may correspond to different valid durations, so that when the user sends a message, when the "Send" key is clicked, a valid duration of the message may be determined by detecting a long-press time of the user. After the message is sent, device ends of both the receiver and the sender are controlled to destroy the message when the valid duration expires.

A correspondence between long-press durations and valid durations may be set to be proportional, which may be an exponential proportion or a linear proportion. For example, according to the linear proportion, a long press for 0.1 second corresponds to a valid duration of 1 minute; a long press for 1 second corresponds to a valid duration of 10 minutes; a long press for 10 seconds corresponds to a valid duration of 100 minutes, and so on. Other proportional correspondences may also be adopted. For example, a correspondence in order of magnitude is adopted: a long press for 1 second corresponds to 1 minute; a long press for 2 seconds corresponds to 1 hour; a long press for 3 seconds corresponds to 1 day, and so on.

However, it should be noted that the correspondence between trigger durations and valid durations listed above is merely a schematic description. Other proportional relationships may also be adopted in actual implementation, which is not limited in the present application and may be selected according to actual needs.

Alternatively, the correspondence may not be set to be proportional. A corresponding proportion table may be preset just as shown in FIGS. 5A-5F, where no specific proportional relationship between trigger durations and valid durations exists, and it is only required that a corresponding valid duration can be found by matching according to the corresponding proportion table.

Figure 6:
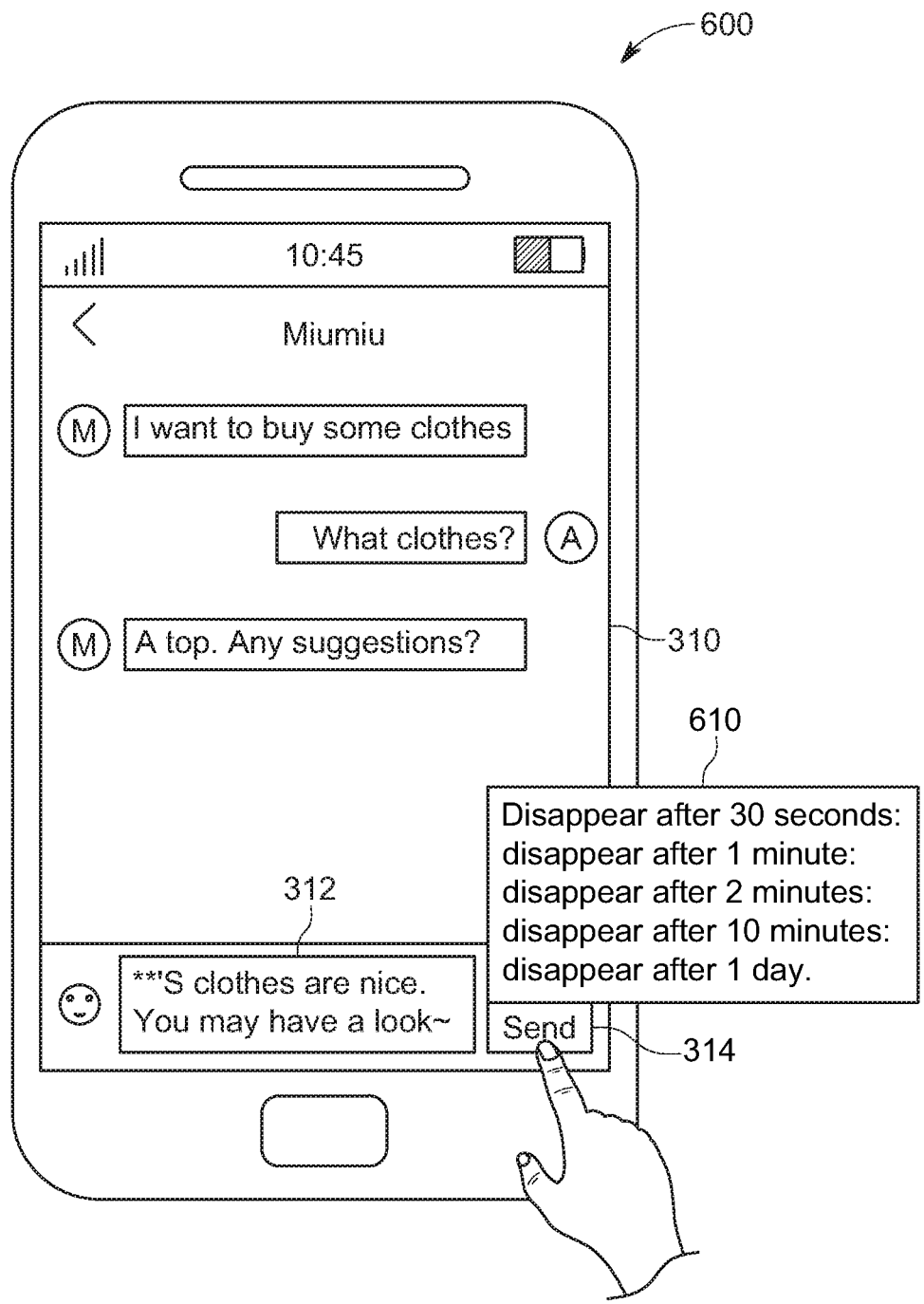
FIG. 6 is a diagram illustrating an example of a smart phone with a trigger interface 600 according to an embodiment of the present invention.
Figure 7:
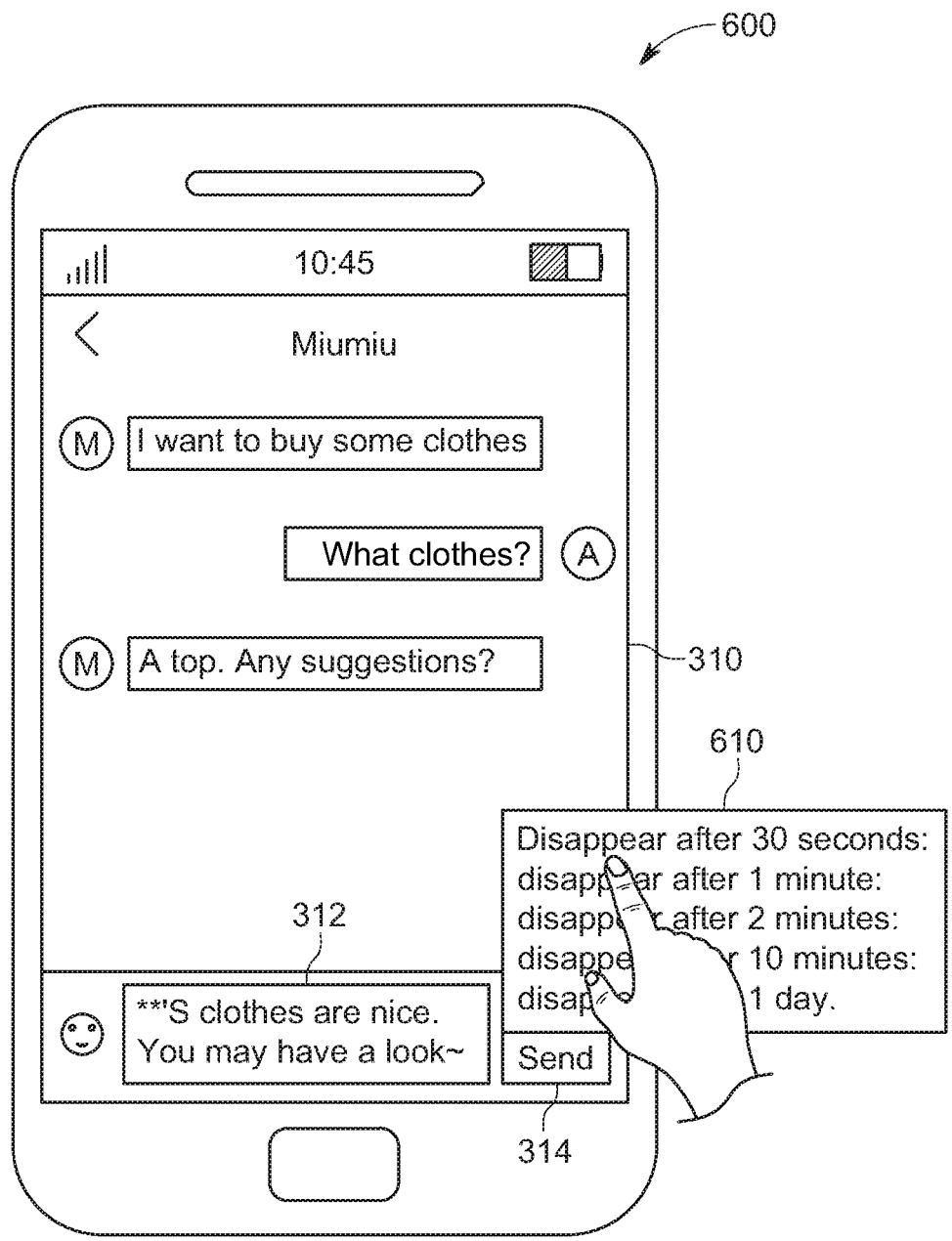
FIG. 7 is another diagram illustrating the smart phone with trigger interface 600 according to an embodiment of the present invention.

FIGS. 6 and 7 show diagrams that illustrate an example of a smart phone with a trigger interface 600 in accordance with the present invention. Interface 600 is similar to interface 300 and, as a result, utilizes the same reference numerals to designate the structures that are common to both interfaces. As shown in FIG. 6, trigger interface 600 differs from interface 300 in that interface 600 includes an example of a valid time selection box 610. In the present example, valid time selection box 610 includes the following selections: disappear after 30 seconds; disappear after 1 minute; disappear after 2 minutes; disappear after 10 minutes; and disappear after 1 day. In one embodiment, as shown in FIG. 6, it is determined, through the force of pressing the send key 314 by the user, whether to send the message in the input box 312 in a secret message mode or to send the message in the input box 312 in a non-secret message mode. As shown in FIG. 6, a plurality of valid durations of messages during sending in a secret message mode may further be set from valid time selection box 610. Specifically, as shown in FIG. 6, the user may press the "Send" key 314 to indicate sending of the message in the input box 312 in the secret message mode. Based on this, the sender selects from valid time selection box 610, according to needs, a desired valid duration of a message as shown in FIG. 7, and performs a point-and-click so that the message in the input box 312 can be sent according to the clicked valid duration.

In order to clearly inform the sender of the valid duration corresponding to a trigger operation, a valid time of a secret message corresponding to a user operation may be displayed within a predetermined range of the send key or in a preset area by using a progress bar or in a text display mode. For example, as shown in FIG. 4, a valid time can be displayed by using text, such as a message 412 which, in the FIG. 4 example reads "Long-press for 0.2 seconds, and a valid time of the message will be 1 minute." In actual implementation, a variety of other manners may be adopted for display, as long as identification can be achieved, which is not limited in the present application.

That is, sending operations of secret messages and non-secret messages can be directly implemented through the send key on the message interface, and the user no longer needs to trigger to enter into the function selection interface to send a secret message, thereby improving user experience.

In one embodiment, the message in the input box described above may include, but is not limited to, at least one of the following: text, a picture, video, voice, and a file.

Figure 8:
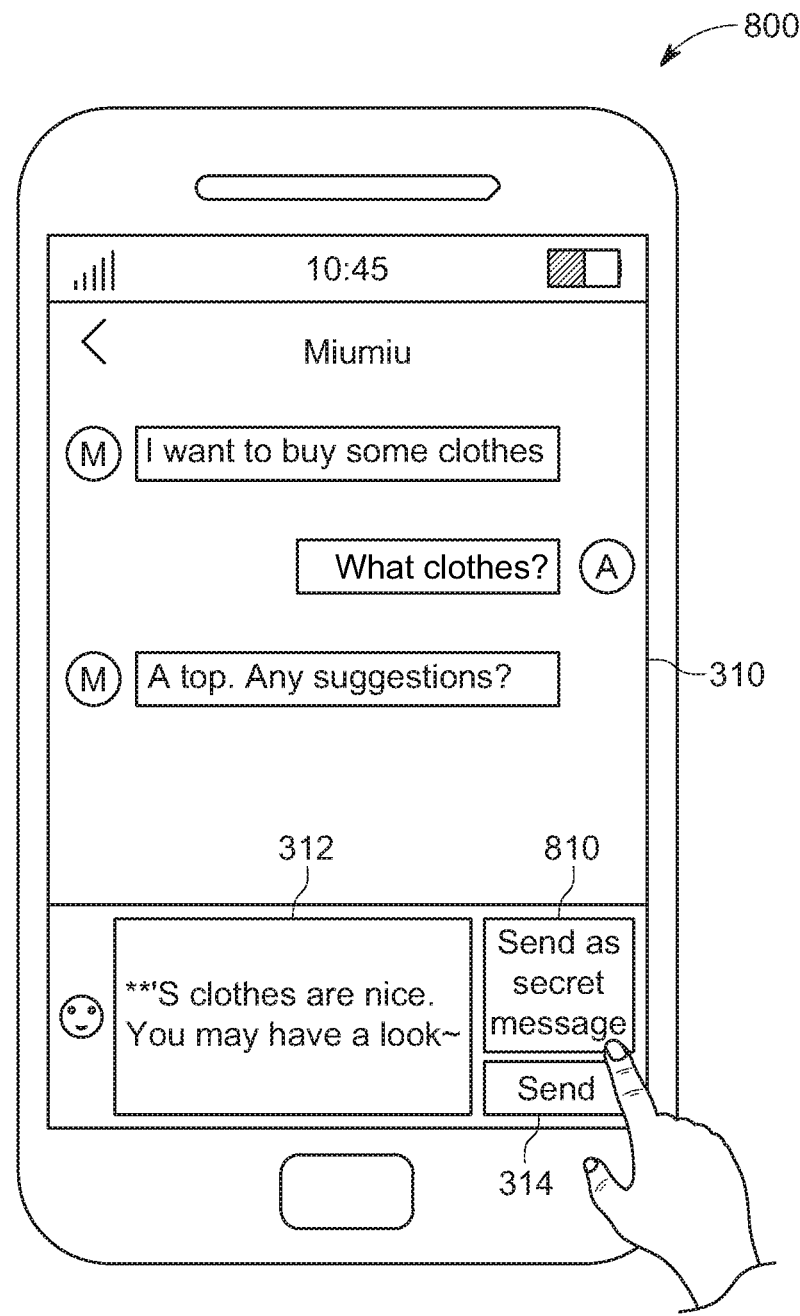
FIG. 8 is a diagram illustrating an example of a smart phone with a trigger interface 800 having two trigger keys according to an embodiment of the present invention.

FIG. 8 shows a diagram that illustrates an example of a smart phone with a trigger interface 800 in accordance with the present invention. Interface 800 is similar to interface 300 and, as a result, utilizes the same reference numerals to designate the structures that are common to both interfaces. As shown in FIG. 8, interface 800 differs from interface 300 in that interface 800 includes a secret message button or key 810, and a send key 314 that has no secret message function. Thus, in interface 800 the send keys of two sending modes "secret message sending" and "non-secret message sending" are separately set. After a message is input to the input box 312, if "Send as Secret Message" 810 is clicked, then sending of the message in a secret message mode is triggered. If the "Send" key is clicked, then sending of the message in a non-secret message mode is triggered. In this manner, the user no longer needs to enter into the function selection interface to select the secret message sending mode, thereby effectively improving user experience and enabling the user to send secret messages more quickly and conveniently.

In implementation, after the "Send as Secret Message" key is clicked, the message in the input box may be sent according to a valid duration (for example, 1 minute) that is preset by the user or fixed. In another embodiment, it may also be set to determine different valid durations through user behaviors. Specifically, if the valid duration is to be set, then the aforementioned manners in FIGS. 5A-5F to FIG. 7 may be adopted, which is not limited in the present application and may be selected according to actual needs in implementation.

However, it should be noted that the time durations and styles, locations, sizes and the like of various function keys listed above or illustrated in the figures are merely a schematic description, and may be set in many other different styles in actual implementation, which is not limited in the present application.

In one embodiment, the valid duration may be counted from a time point at which a message is sent, or may be counted from a time point at which a message is received, or may be counted from a time point at which a message is viewed by the receiver. For example, if the valid duration (for example, 3 minutes) is counted from a time point at which a message is sent, then timing starts at a time point of detecting that the user clicks the send key to trigger a send instruction, and the message sent according to the send instruction is destroyed when the timing reaches 3 minutes. For example, if the valid duration (for example, 3 minutes) is counted from a time point at which a message is received, then timing starts at a time point of detecting that the receiver receives the message, and the message is destroyed when the timing reaches 3 minutes. For example, if the valid duration (for example, 3 minutes) is counted from a time point at which a message is viewed by the receiver, then timing starts at a time point of detecting that the user views the message, and the message is destroyed when the timing reaches 3 minutes.

The destroying the message manner may be controlling both the sender and the receiver to automatically destroy the message, or may be controlling only the sender to automatically destroy the message, or controlling only the receiver to automatically destroy the message. The specific manner to be adopted may be selected according to actual needs and is not limited in the present application.

The destroying the message manner may be destroying only display content in the display interface of the receiver or the sender, reserving local storage of the receiver or the sender, or may be deleting both the display and the local storage. The specific manner to be adopted may be selected according to actual needs.

In implementation, a setting interface may be provided to the user. Specifically, a setting interface may be provided to the sender and/or the receiver, so that the sender and/or the receiver can configure settings according to needs or requirements, that is, may set whether messages sent are destroyed at the sender or destroyed at the receiver, or may set whether messages received are destroyed. The setting may be setting messages from a certain person, or may be setting messages sent to a certain person, or may be setting messages from a few persons, or may be setting messages sent to a few persons, or may be setting messages from a certain group, or may be setting messages sent to a certain group.

Figure 9B:
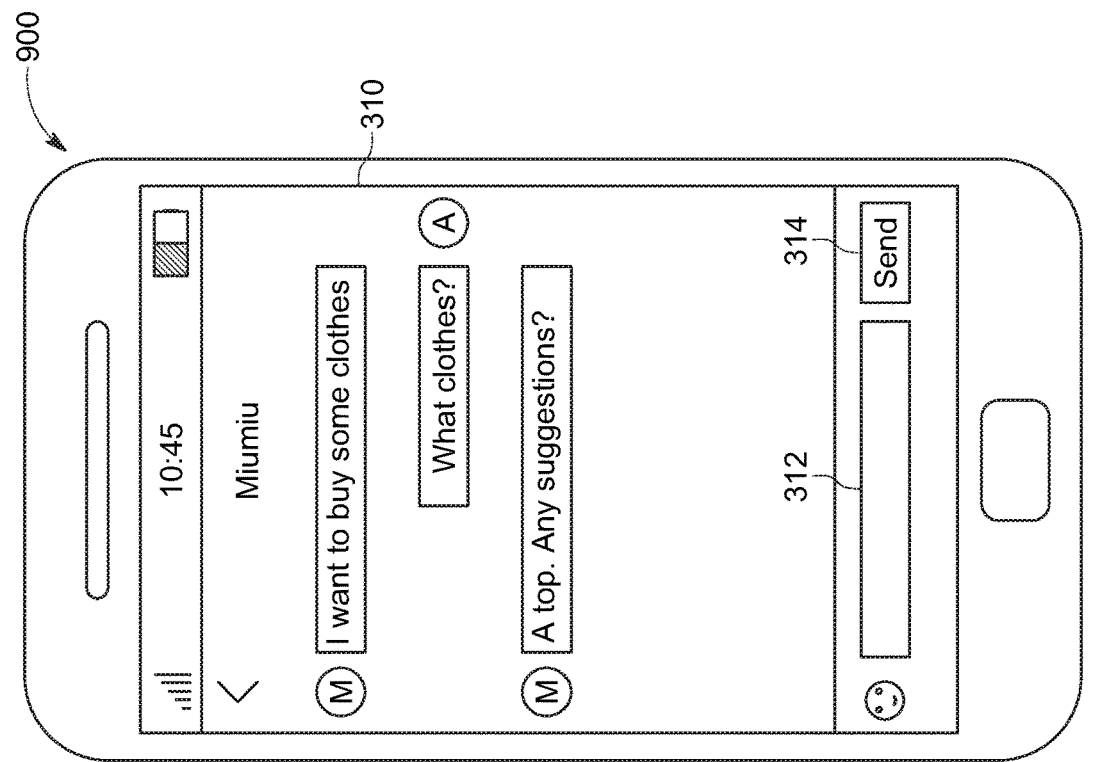
FIGS. 9A and 9B are sequential diagrams illustrating an example of the destruction operation of a smart phone with a trigger interface 900 of a message sender according to an embodiment of the present invention.
Figure 9A:
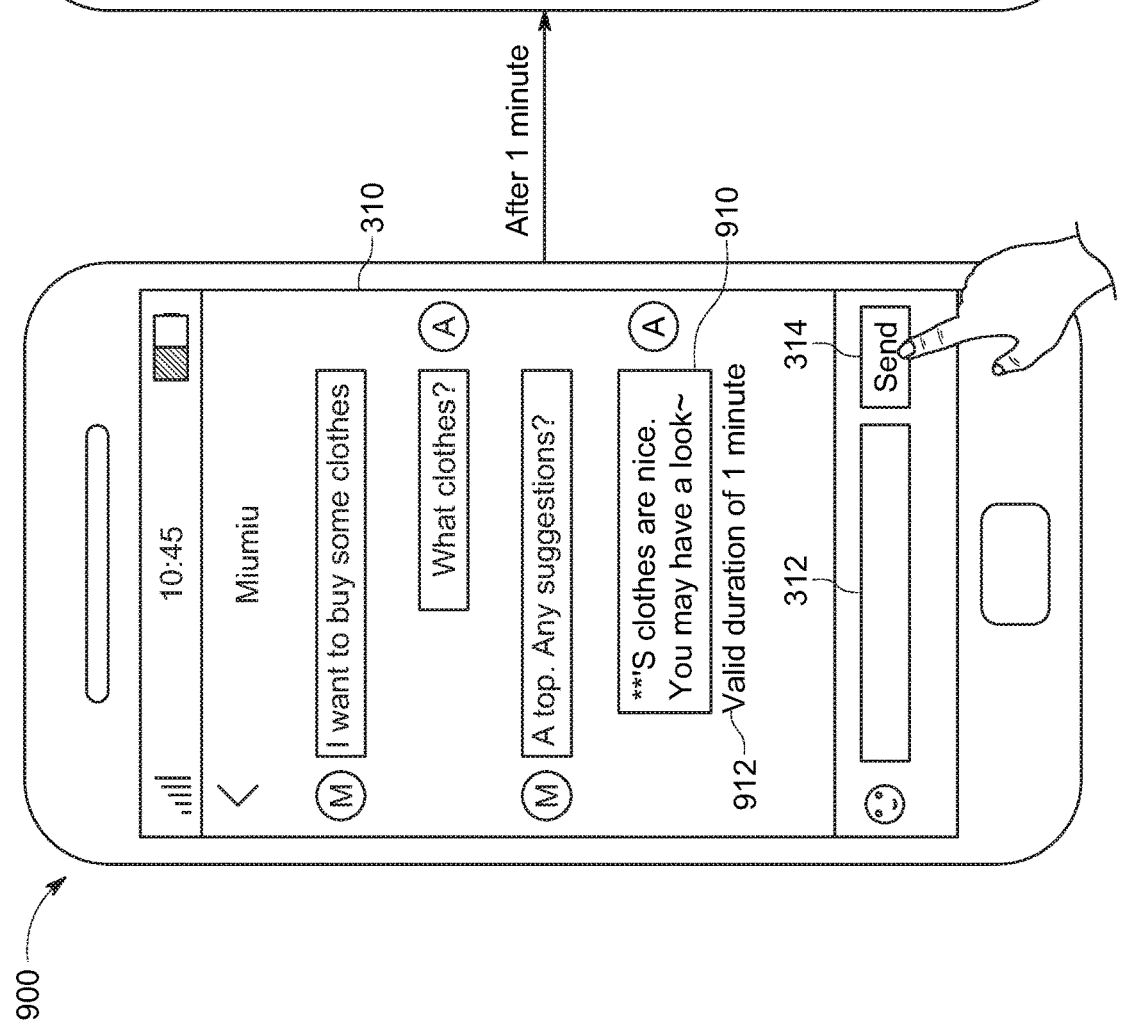
Figure 10B:
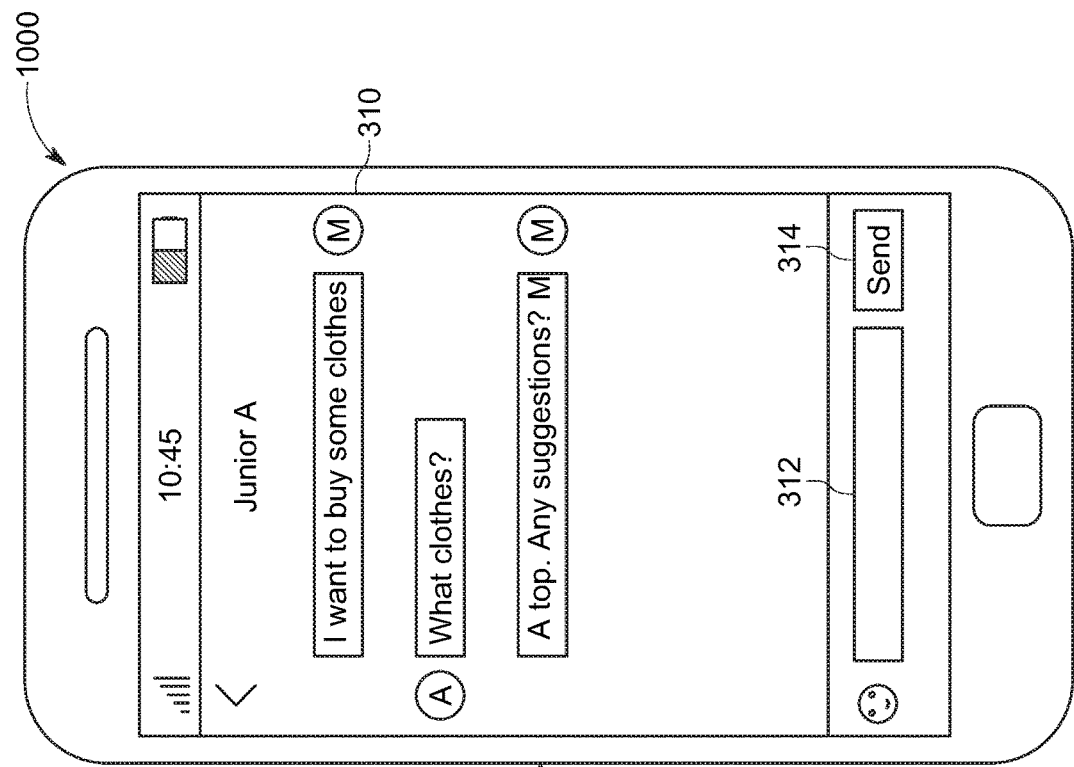
FIGS. 10A and 10B are sequential diagrams illustrating an example of the destruction operation of a smart phone with a trigger interface 1000 of a message receiver according to an embodiment of the present invention.
Figure 10A:
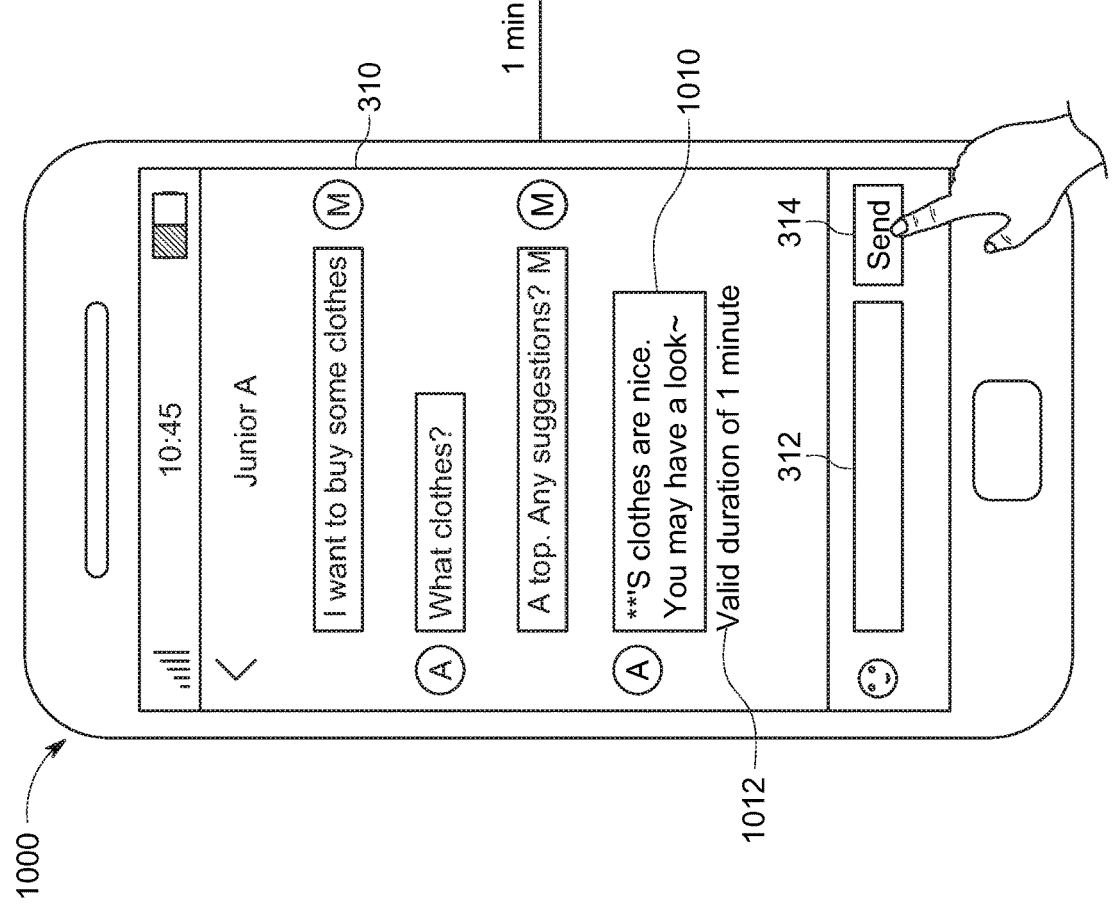

FIGS. 9A and 9B show sequential diagrams that illustrate an example of the destruction operation of a smart phone with a trigger interface 900 of a message sender in accordance with an embodiment of the present invention. Interface 900 is similar to interface 300 and, as a result, utilizes the same reference numerals to designate the structures that are common to both interfaces. In operation, as shown in FIG. 9A, after the sender sends a secret message 910 in a secret message mode, the secret message 910 is displayed in current dialog box 310 of the sender along with an informational tag 912 which, in the FIG. 9A example reads "Valid duration of 1 minute." As shown in FIG. 9B, when a valid duration of 1 minute expires, the message 910 will be automatically destroyed on the interface of the sender and will no longer be displayed. FIGS. 10A and 10B show sequential diagrams that illustrate an example of the destruction operation of a smart phone with a trigger interface 1000 of a message receiver in accordance with an embodiment of the present invention. Interface 1000 is similar to interface 300 and, as a result, utilizes the same reference numerals to designate the structures that are common to both interfaces. In operation, as shown in FIG. 10A, after the receiver receives a secret message 1010 sent in a secret message mode, the secret message 1010 is displayed in the current dialog box 310 of the receiver along with an informational tag 1012 which, in the FIG. 10A example reads "Valid duration of 1 minute." As shown in FIG. 10B, when a valid duration of 1 minute expires, the message 1010 will be automatically destroyed on the interface of the receiver and will no longer be displayed.

Figure 11:
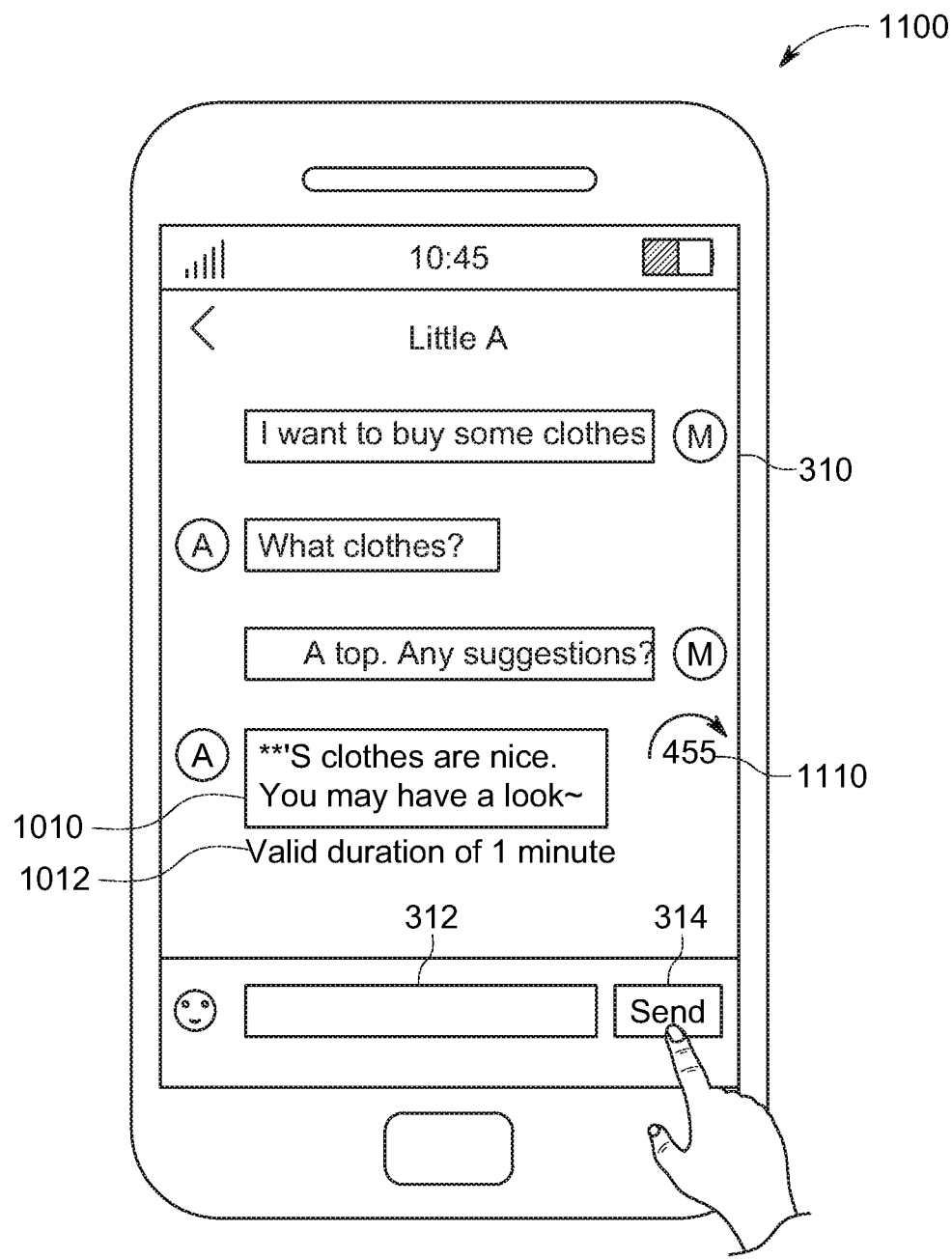
FIG. 11 is a diagram illustrating an example of a smart phone with a trigger interface 1100 that has a secret message prompt according to an embodiment of the present invention.

FIG. 11 shows a diagram that illustrates an example of a smart phone with a trigger interface 1100 in accordance with the present invention. Interface 1100 is similar to interface 1000 and, as a result, utilizes the same reference numerals to designate the structures that are common to both interfaces. As shown in FIG. 11, trigger interface 1100 differs from interface 1000 in that interface 1100 includes a secret message disappear time prompt 1110, which in the present example shows 45 seconds left of a one minute valid time duration. The receiver may receive a secret message on a separate secret message receiving interface, or may receive a secret message on a normal session interface. To allow a secret message to be received on the normal session interface, the receiver may be informed, with a prompt that may be displayed on the interface of the receiver, that the received message is a message sent in a secret message mode. For example, as shown in FIG. 11, disappear time prompt 1110 may be given to remind the receiver that the message is sent in a secret message mode and how long it will take for the message will be destroyed.

Figure 12:
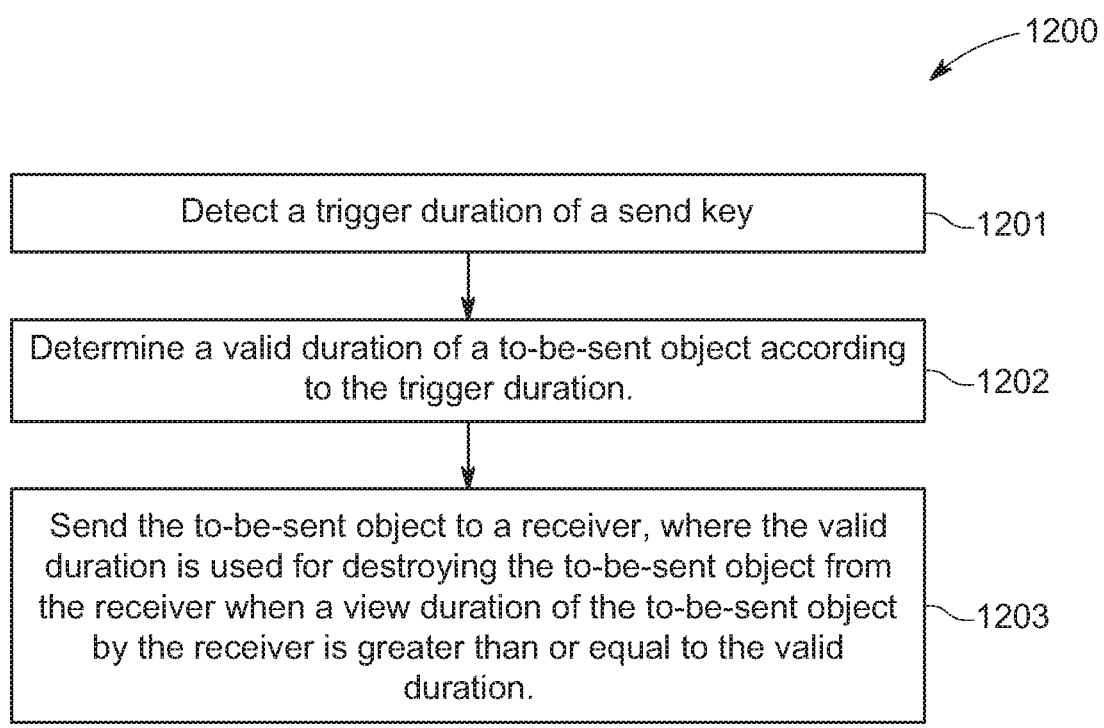
FIG. 12 is a flowchart illustrating an example of a message sending method 1200 according to an embodiment of the present invention.

FIG. 12 is a flowchart that illustrates an example of a method 1200 of sending a message in accordance with the present application. Although the present application provides operation steps of the method or an apparatus structure as shown in the following embodiments or accompanying drawings, more or fewer operation steps or modular units can be included in the method or apparatus according to conventional practices or without creative effort. In the steps or structures without necessary causal relationship in terms of logic, the execution sequence of these steps or the modular structure of the apparatus are not limited by the execution sequences or the modular structures described in the embodiments or illustrated in the accompanying drawings of the present application. When applied in an actual apparatus or terminal product, the methods or the modular structures can be executed sequentially or in parallel according to the methods or the modular structures shown in the embodiments or accompanying drawings (for example, by parallel processors or in a multithreading environment, or even in a distributed processing environment).

Specifically, as shown in FIG. 12, a message sending method provided in an embodiment of the present application may include:

S1201: detect a trigger duration of a send key;

S1202: determine a valid duration of a to-be-sent object according to the trigger duration; and S1203: send the to-be-sent object to a receiver, where the valid duration is used for destroying the to-be-sent object from the receiver when a view duration of the to-be-sent object by the receiver is greater than or equal to the valid duration.

In implementation, these operations may be implemented jointly by a forwarding server and a terminal side. Specifically, the forwarding server may acquire, through a sender, a trigger duration of a send key by a user so as to obtain a corresponding valid duration via matching. Then, when a to-be-sent object is sent to a receiver, destruction of the to-be-sent object is triggered when a view duration of the to-be-sent object by the receiver is greater than or equal to the valid duration. The view duration refers to a time length counted from the first time the receiver views the object. For example, timing starts when the receiver opens the object, and 10 seconds, 30 seconds, or 1 minute elapses, where the 10 seconds, 30 seconds, or 1 minute is calculated as the view duration. The operations of detecting and determining the valid duration may also both be implemented on a client side; the forwarding server is only responsible for message sending, and the message destruction operation is also implemented on the client side. The specific implementation process may be determined according to actual needs and is not limited in the present application.

In implementation, only messages on the receiver may be destroyed, or only messages on the sender may be destroyed, or both messages on the sender and messages on the receiver may be destroyed. The specific manner to be selected is not limited in the present application.

In this example, an existing message send key is also used as a send key for secret messages; the send key can be used to confirm a valid duration of a secret message, so that the user can send a secret message without entering into a function selection interface and, at the same time, keep the existing message interface intact, thereby reducing changes to the interface and improving the sending efficiency of secret messages. Specifically, different control instructions may be generated through trigger durations of the send key by the user. That is, it may be determined, through different trigger durations, whether to send in a normal message mode or to send in a secret message mode. Moreover, different valid durations may be determined according to different trigger durations.

In the above manner, the message sending interface is relatively simple and occupation of the space of the interface can be reduced. Different send instructions can be generated by detecting in real time the operating force or time of the send key by the sender. That is, through the operating force or a press duration of the send key by the sender, the following can be determined: whether to send in a secret message mode, or to send using a non-secret message, as well as a valid duration of a message during sending using a secret message.

The to-be-sent object mentioned above may include, but is not limited to, at least one of the following: text, a picture, video, voice, and a file. However, it should be noted that the type of to-be-sent object listed above is merely an exemplary description. Other types of to-be-sent objects may also exist in implementation. Messages that can be sent through communication software or a communication platform all can be sent in the aforementioned manner, which is not limited in the present application.

It should be noted that the aforementioned example is described mainly by using sending messages between chat software as an example. In actual implementation, the aforementioned message sending method may also be applied to other platforms involving message sending. For example, the method may be applied to blog comments, forum comments, product reviews on shopping platforms, or the like. The aforementioned secret message sending method can be used.

The aforementioned trigger time may be a time of long-pressing the send key. In determining a valid duration, it may be set that different trigger times correspond to different valid durations. For example, a long press of the send key by the sender for 2 seconds corresponds to a valid duration of 1 minute, a long press of the send key for 5 seconds corresponds to a valid duration of 3 minutes, and so on, so that different valid durations can be determined through different long-press times of the sender, thereby achieving simple implementation.

To inform the sender that a valid duration of a secret message whose sending is triggered by the sender himself, a valid duration corresponding to a trigger time may be displayed within a predetermined range of a first send key according to different long-press times of the user, thereby achieving the reminding function of the prompt.

In the method introduced in the aforementioned example, when a message is sent, whether the message is sent in a secret message mode or a non-secret message mode is already determined. In this example, consider the following: a selection operation of whether a message is to be destroyed or is a secret message may also be performed after the message is sent. In this way, secret message sending of a message can be achieved without the need to press additional buttons on the sending interface of the message.

Accordingly, a message sending method is provided in this example, which may include the following steps:

S1: send a data object to a receiver, where the data object may include, but is not limited to, at least one of the following: text, a picture, video, voice, and a file;

S2: detect a trigger operation of a sender on the sent object; and

S3: in response to the trigger operation, destroy the data object from the receiver when a view duration of the data object by the receiver is greater than or equal to a valid duration.

Figure 13:
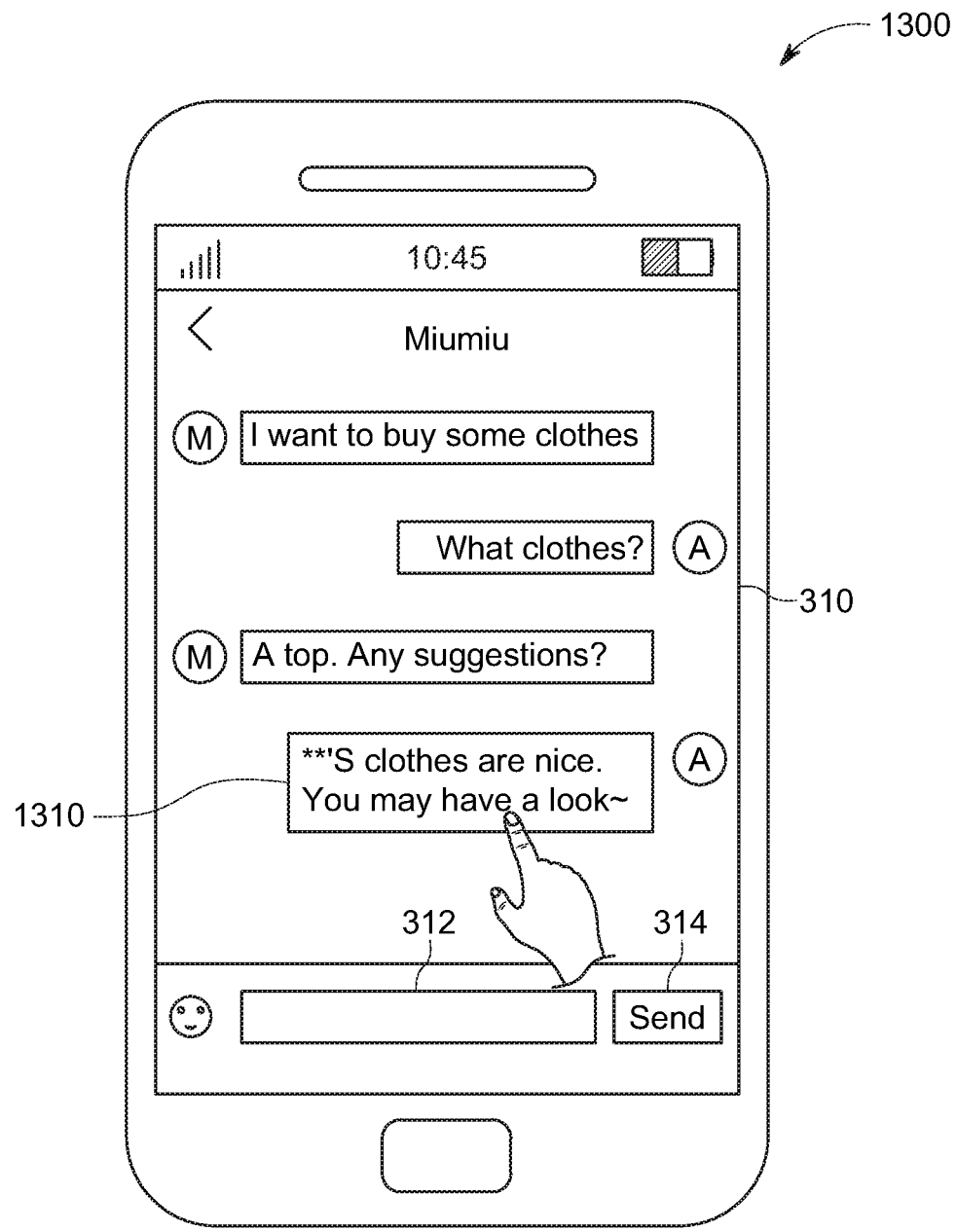
FIG. 13 is a diagram illustrating an example of a smart phone with a trigger interface 1300 of secret message sending according to an embodiment of the present invention.

FIG. 13 shows a diagram that illustrates an example of a smart phone with a trigger interface 1300 in accordance with the present invention. Interface 1300 is similar to interface 300 and, as a result, utilizes the same reference numerals to designate the structures that are common to both interfaces. As shown in FIG. 13, trigger interface 1300 differs from interface 300 in that a message can be designated as a secret message after the message has been sent. The aforementioned trigger operation may be, for example, a long press, a point-and-click, a press greater than a preset force, or the like. For example, as shown in FIG. 13, the sender has sent a message 1310 in a normal manner as shown in current dialog box 310. In this case, the sending user may click the message 1310, for example, in the aforementioned trigger mode, and then set the message as a secret message.

For example, a long-press mode may be adopted. Different long-press durations may correspond to different valid durations. Reference may be made to the description in the aforementioned example for the correspondence between long-press durations and valid durations, which will not be described herein again.

Figure 14:
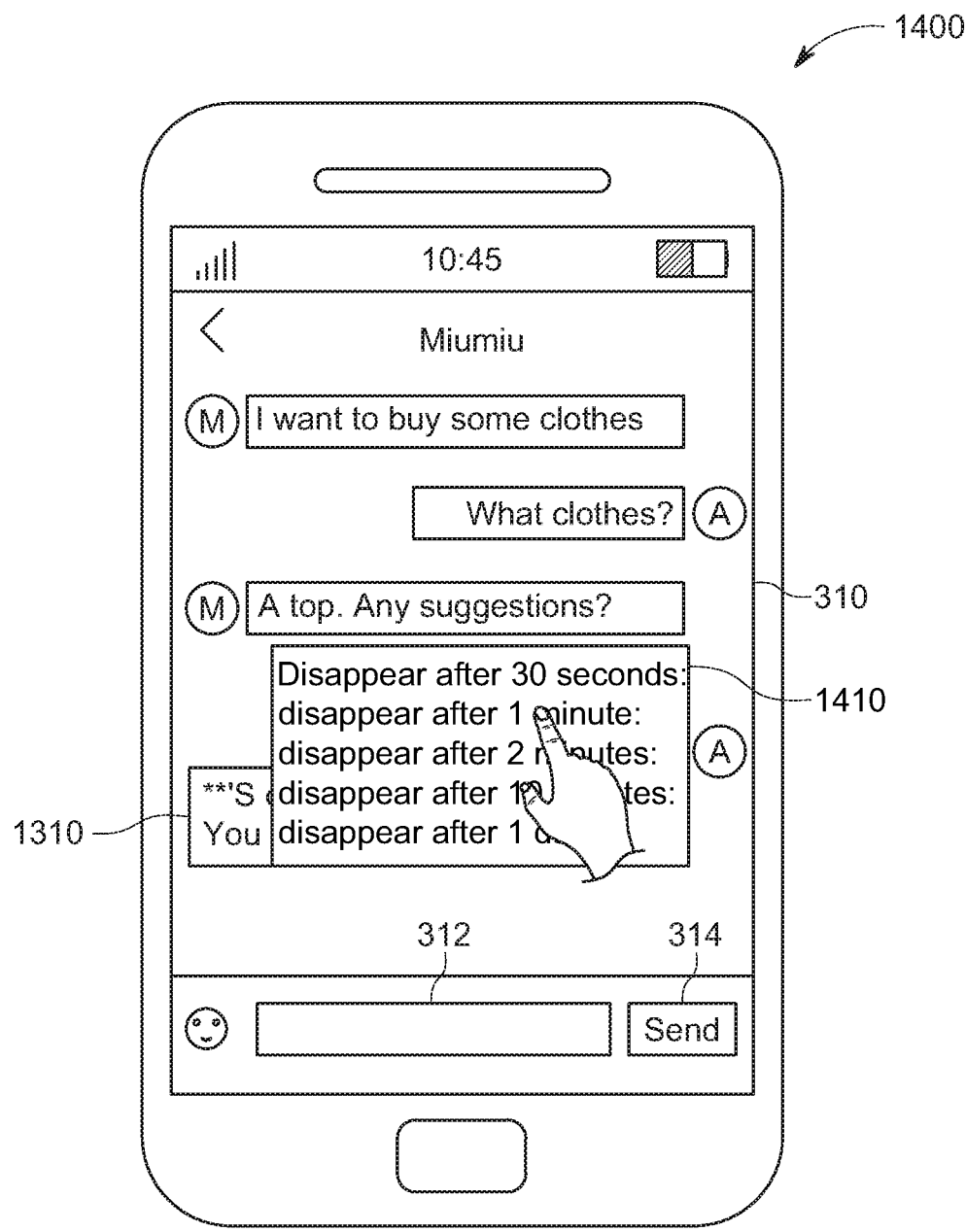
FIG. 14 is a diagram illustrating an example of a smart phone with a trigger interface 1400 of secret message sending according to an embodiment of the present invention.
Figure 15:
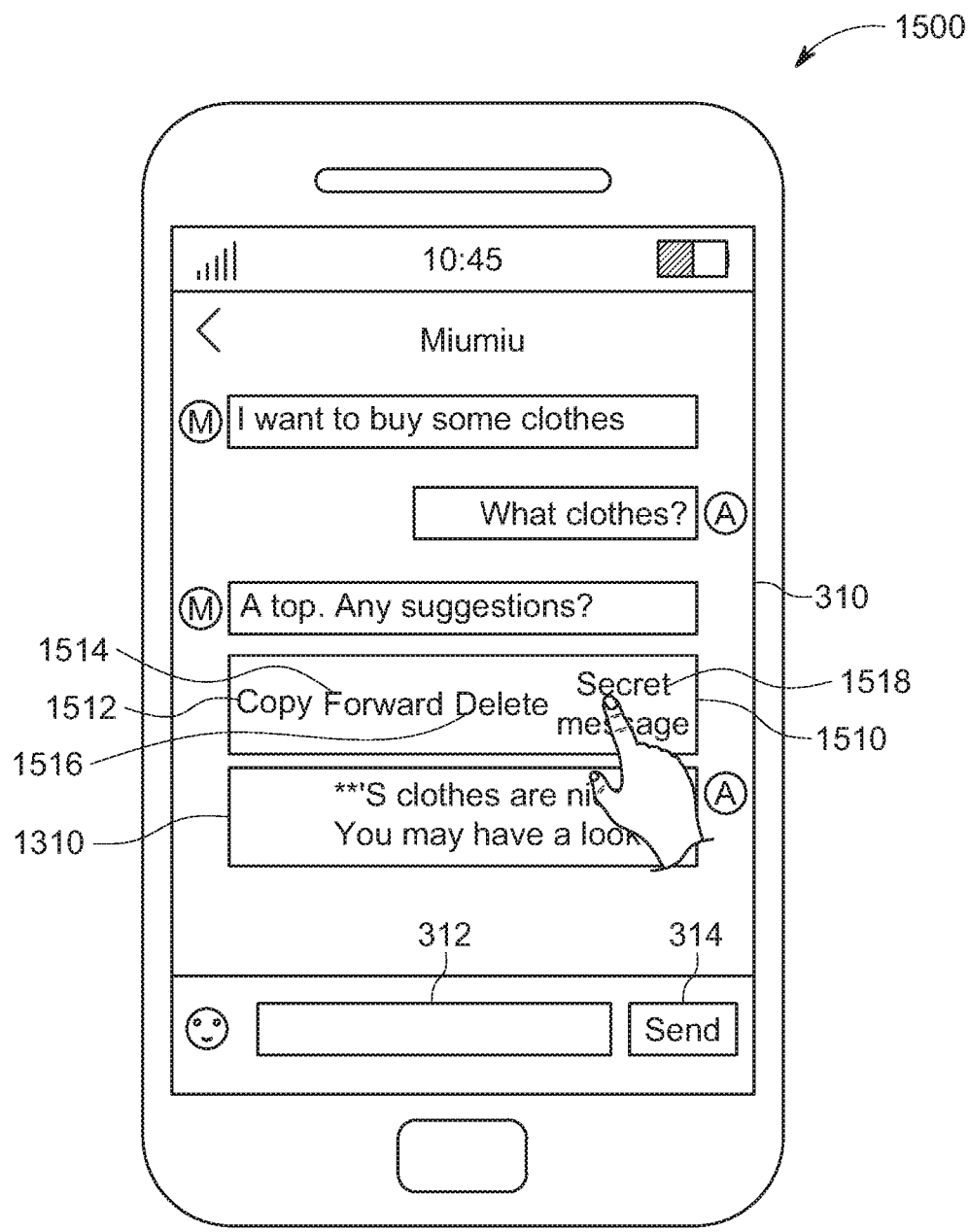
FIG. 15 is a diagram illustrating an example of a smart phone with a trigger interface 1500 of secret message sending according to an embodiment of the present invention.

FIG. 14 shows a diagram that illustrates an example of a smart phone with a trigger interface 1400 in accordance with the present invention. Interface 1400 is similar to interface 1300 and, as a result, utilizes the same reference numerals to designate the structures that are common to both interfaces. As shown in FIG. 14, interface 1400 illustrates a click trigger operation. A click (for example, click or double-click) mode may also be adopted to trigger display of valid duration options near the message. After sending message 1310, the sender may trigger with a click to select a desired valid duration. For example, as shown in FIG. 14, in the case of user trigger, valid duration options are displayed in an options box 1410 near message 1310, and the user may select a corresponding valid duration (for example, 1 minute) to set the message as a secret message for the receiver. FIG. 15 shows a diagram that illustrates an example of a smart phone with a trigger interface 1500 in accordance with the present invention. Interface 1500 is similar to interface 1300 and, as a result, utilizes the same reference numerals to designate the structures that are common to both interfaces. As shown in FIG. 15, interface 1500 illustrates that instead of options box 1410, an options box 1510 that includes a copy button 1512, a forward button 1514, a delete button 1516, and a secret message button 1518 may be displayed. As shown in FIG. 15, the user clicks sent message 1310, and a plurality of options are displayed in options box 1510. One of the options is "Secret Message." After the sender selects the "Secret Message," the message 1310 will be used as a secret message for the receiver. A valid duration of the secret message may be preset or a system default, or further operationally selected by the user. The specific manner to be adopted is not specifically limited in the present application.

Another message sending method further provided in an embodiment of the present application may include:

S1: send a to-be-sent object in an input box in response to an operation on a first send key; and S2: control, according to a valid duration, the to-be-sent object to be destroyed.

Considering the limited space on the message interface, a trigger key may be separately set as a control key, or the control key may be combined with a send key into one key. The space of the message interface can be effectively saved by combining the control key and the send key into one key.

For example, a schematic diagram illustrating an interface where the "control key" and the "send key" may be combined into one key. Considering the integration of the "control key" and the "send key" into one key, in order to enable one key to implement a plurality of control functions, different control instructions may be generated through different long-press durations of the user, or different control instructions may be generated through different forces of clicking the key by the user.

The operation on the first send key may be a click operation, a long-press operation, or the like. The valid duration may be preset or selected by the user, or may be a system default, which may be selected according to actual needs.

A message sending method further provided in an embodiment of the present application may include:

S1: display a valid time selection content in response to a trigger operation on a first send key;

S2: receive selection of a valid time in the valid time selection content; and

S3: send a to-be-sent object and perform control to destroy the to-be-sent object according to the selected valid duration.

That is, a selection box may be displayed when a user triggers the first send key, where a plurality of valid durations to be selected may be set, and the user may select a desired valid duration according to needs. Accordingly, when sending of the message is triggered, the valid duration is used as a basis of a destruction time.

According to the embodiments of the present application, it should be noted that the steps shown in the flowchart of the drawings may be performed in a computer system such as a set of computer-executable instructions. Although a logical order is shown in the flowchart, in some cases, the illustrated or described steps may be performed in a different order other than the one shown here.

Figure 16:
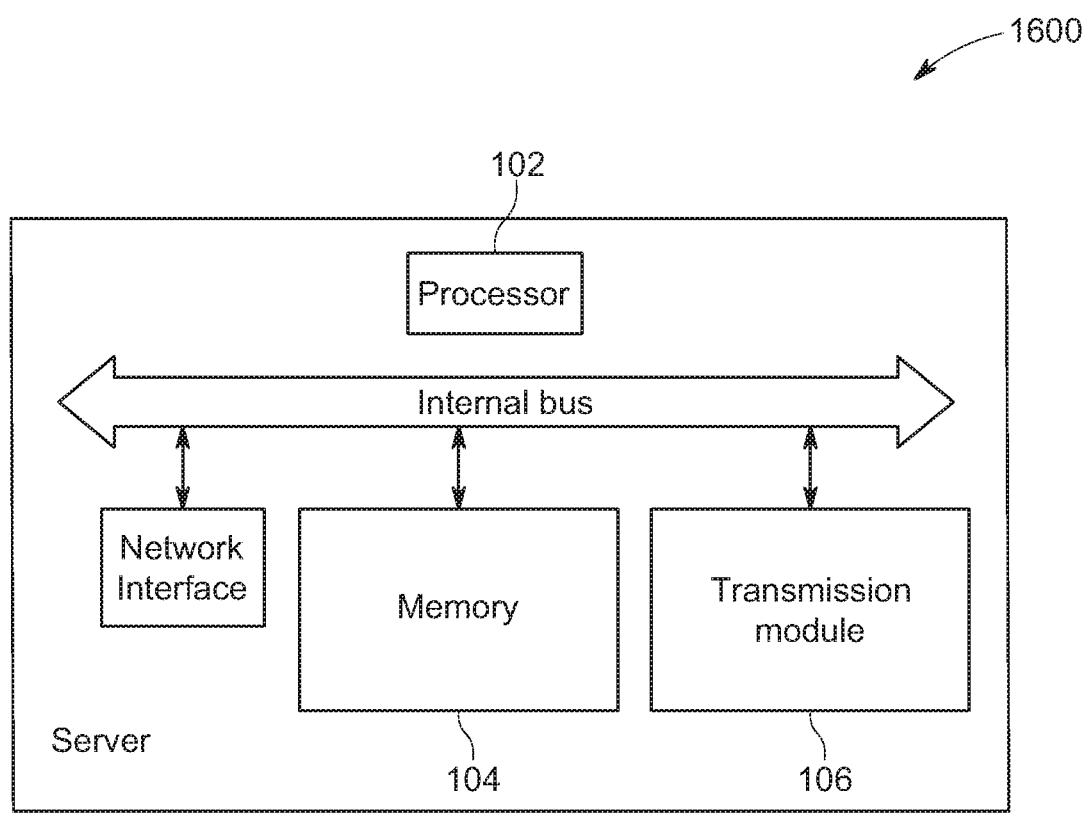
FIG. 16 is a block diagram illustrating an example of a mobile terminal 1600 according to an embodiment of the present invention.

The method embodiment provided in the present application may be executed in a mobile terminal, a computer terminal, or a similar computing apparatus. Using execution on a computer terminal as an example, FIG. 16 is a block diagram illustrating an example of a hardware structure of a computer terminal 1600 of a message sending method according to an embodiment of the present invention. As shown in FIG. 16, the computer terminal 1600 may include one or a plurality of (only one is shown in the figure) processors 102 (the processor 102 may include, but is not limited to, a processing apparatus such as a microprocessor (MCU) or a programmable logic device (FPGA)), a memory 104 configured to store data, and a transmission module 106 configured to implement a communication function. A person of ordinary skill in the art can understand that the structure shown in FIG. 16 is merely exemplary and does not limit the structure of the aforementioned electronic apparatus. For example, the computer terminal 1600 may also include more or fewer components than those shown in FIG. 16, or have a different configuration from that shown in FIG. 16.

The memory 104 may be configured to store software programs and modules of application software, such as program instructions/modules corresponding to the short message sending method in the embodiment of the present invention. The processor 102 executes the software programs and modules stored in the memory 104 so as to execute various functional applications and data processing, namely, implement the aforementioned short message sending method of the application programs. The memory 104 may include a high-speed random-access memory, and may also include a non-volatile memory such as one or a plurality of magnetic storage apparatuses, a flash memory, or other non-volatile solid-state memories. In some examples, the memory 104 may further include memories arranged remotely with respect to the processor 102. The remote memories may be connected to the computer terminal 1600 via a network. Examples of the aforementioned network include, but are not limited to, the Internet, intranets, local area networks, mobile communication networks, and the combinations thereof.

The transmission module 106 is configured to receive or send data via a network. Specific examples of the aforementioned network may include a wireless network provided by a communication provider of the computer terminal 1600. In one example, the transmission module 106 includes a network adapter (network interface controller, NIC), which may be connected to other network devices through a base station so as to communicate with the Internet. In one example, the transmission module 106 may be a radio frequency (RF) module for wirelessly communicating with the Internet.

Figure 17:
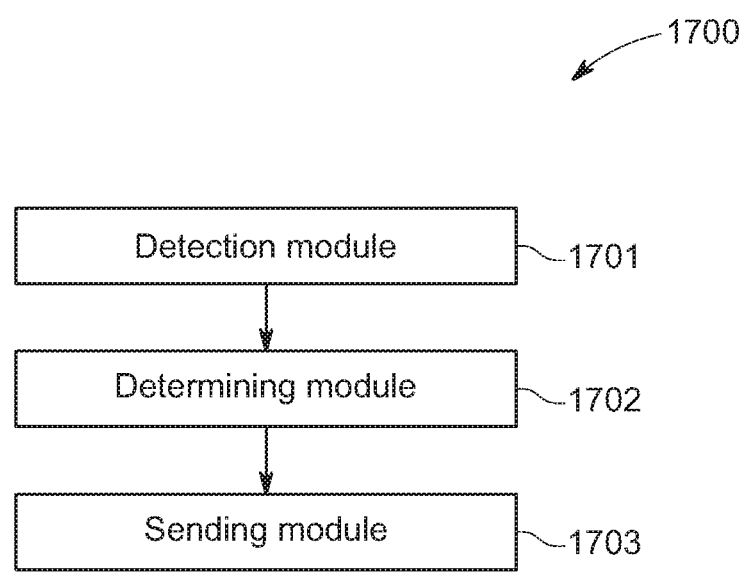
FIG. 17 is a block diagram illustrating an example of a message sending apparatus 1700 according to an embodiment of the present invention.

FIG. 17 shows a block diagram that illustrates an example of a message sending apparatus 1700 in accordance with an embodiment of the present invention. Referring to FIG. 17, in a software implementation, the message sending apparatus 1700 may be applied to a terminal of a sending client, or may be applied to a forwarding server, and may include: a detection module 1701, a determining module 1702, and a sending module 1703, where: the detection module 1701 is configured to detect a trigger duration of a send key; the determining module 1702 is configured to determine a valid duration of a to-be-sent object according to the trigger duration; and the sending module 1703 is configured to send the to-be-sent object to a receiver, where the valid duration is used for destroying the to-be-sent object from the receiver when a view duration of the to-be-sent object by the receiver is greater than or equal to the valid duration.

In one embodiment, the to-be-sent object may include, but is not limited to, at least one of the following: text, a picture, video, voice, and a file. In one embodiment, different trigger times correspond to different valid durations. In one embodiment, the trigger time may be a time of long-pressing the send key. In one embodiment, the trigger duration has a proportional relationship with the valid duration.

In one embodiment, the to-be-sent object may also be destroyed from the sender when the view duration of the to-be-sent object by the receiver is greater than or equal to the valid duration. In one embodiment, the sending the to-be-sent object to a receiver may include: sending the valid duration and the to-be-sent object to the receiver.

In one embodiment, the valid duration may further be sent to a message server, where the message server may send a destruction instruction to the receiver when determining that the view duration of the to-be-sent object by the receiver is greater than or equal to the valid duration. Specifically, in implementation, the message server may control, according to the valid duration, the receiver to destroy a data object, or the valid duration may be directly sent to the receiver so that the receiver locally makes judgment.

In the embodiments of the present invention, a valid duration of a secret message can be determined through a trigger duration of a send key by a sender, so as to send the secret message and make it unnecessary for the sender to enter into a special secret message sending interface to send the secret message, thereby achieving simple implementation. The technical problem of poor user experience caused by the existing overly cumbersome secret message sending process is solved in the above manner, thereby achieving the technical effect of easily and efficiently sending secret messages.

Although the present application provides operation steps of the method as shown in the embodiments or flowcharts, more or fewer operation steps can be included according to conventional practices or without creative effort. The sequence of steps listed in the embodiment is merely one of numerous step execution sequences and does not represent only a single execution sequence. When executed in an actual apparatus or client product, the steps may be executed sequentially or in parallel according to the methods shown in the embodiments or accompanying drawings (for example, by parallel processors or in a multithreading environment).

The apparatus or module illustrated in the aforementioned embodiments may be specifically implemented by a computer chip or an entity, or a product having a certain function. For the sake of convenient description, the above apparatuses are functionally divided into various modules which are separately described. When implementing the present application, the functions of various modules may be implemented in one or a plurality of instances of software and/or hardware. Certainly, a module that implements a function may also be implemented by a plurality of submodules or subunits.

In the method, apparatus, or modules in the present application, a controller may be implemented in any suitable manner by computer-readable program code. For example, the controller may use the form of a microprocessor or processor and a computer-readable medium that stores computer-readable program code (for example, software or firmware) executable by the (micro)processor, logic gates, switches, an application specific integrated circuit (ASIC), a programmable logic controller, and an embedded microcontroller. The examples of controllers include, but are not limited to, the following microcontrollers: ARC 625D, Atmel AT91SAM, Microchip PIC18F26K20, and Silicone Labs C8051F320. The memory controller may also be implemented as part of the memory control logic. Those skilled in the art also know that, in addition to implementing a controller by pure computer-readable program code, with a logic programming of method or steps the controller may implement the same function in the form of a logic gate, a switch, an application specific integrated circuit, a programmable logic controller, an embedded microcontroller, or the like. Therefore, such a controller may be regarded as a hardware component, and its apparatus for implementing various functions may be regarded as an internal structure of the hardware component. Or, the apparatus for implementing various functions can even be regarded as both a software module for implementing a method and a structure in a hardware component.

Some modules in the apparatus of the present application may be described in a general context of computer-executable instructions executed by a computer, such as a program module. Generally, the program module includes routines, programs, objects, components, data structures, classes, and so on, for executing particular tasks or implementing particular abstract data types. The present application may also be implemented in distributed computing environments. In the distributed computing environments, tasks are executed by remote processing devices that are connected by a communication network. In a distributed computing environment, the program module may be located in local and remote computer storage media including storage devices.

Through the above description of the embodiments, those skilled in the art can clearly understand that the present application can be implemented by means of software plus necessary hardware. Based on such understanding, the substance of the technical solutions of the present application, or the portion of the present application that makes contribution to the prior art, may be embodied in the form of a software product, or may be embodied in the implementation process of data migration. The computer software product may be stored in a storage medium such as a ROM/RAM, a magnetic disk, or an optical disc, and include a plurality of instructions to instruct a computer device (which may be a personal computer, a mobile terminal, a server, a network device, or the like) to perform the methods described in the embodiments or in some parts of the embodiments of the present application.

The embodiments in the present specification are described in a progressive manner. For identical or similar parts between different embodiments, reference may be made to each other so that each of the embodiments focuses on differences from other embodiments. All or part of the present application may be used in an environment or in a configuration of universal or specialized computer systems. Examples include: a personal computer, a server computer, a handheld device or a portable device, a tablet device, a mobile communication terminal, a multi-processor system, a microprocessor-based system, a programmable electronic device, a network PC, a small-scale computer, a large-scale computer, and a distributed computing environment including any system or device above.

Although the present application is described through the embodiments, those of ordinary skill in the art know that the present application has many modifications and variations without departing from the spirit of the present application. It is intended that the appended claims include these modifications and variations without departing from the spirit of the present application.

What is claimed is:

1. A message sending method, comprising:
   detecting, by a processor, a trigger duration of a message send key, on a message interface;
   determining, by the processor, a valid duration of a to-be-sent object, in a message, according to the trigger duration, wherein the determining the valid duration of the to-be-sent object, in the message, comprises determining the valid duration according to a mapping between different trigger durations and different valid durations, and wherein the mapping is stored in a preset table; and
   sending, by the processor, the message to a receiver, wherein the valid duration is used for destroying the message from the receiver when a view duration of the message by the receiver is greater than or equal to the valid duration.

2. The method according to claim 1, wherein the sending the message to the receiver comprises:
   sending the valid duration and the message to the receiver.

3. The method according to claim 1, further comprising:
   sending the valid duration to a message server, wherein the message server sends a destruction instruction to the receiver when the view duration of the message by the receiver is greater than or equal to the valid duration.

4. The method according to claim 1, wherein the to-be-sent object comprises one or more of the following: text, a picture, video, voice, and a file.

5. The method according to claim 1, wherein the trigger duration has a proportional relationship with the valid duration.

6. The method according to claim 1, further comprising:
   destroying the message from a sender when the view duration of the message by the receiver is greater than or equal to the valid duration.

7. The method according to claim 1, wherein the determining the valid duration of the to-be-sent object, in the message, according to the trigger duration comprises:
   displaying the valid duration corresponding to the trigger duration within a predetermined range of the message send key.

8. The method according to claim 1, wherein the trigger duration is a time of long-pressing the message send key.

9. The method according to claim 1, wherein the different trigger durations have non-proportional relationship with the different valid durations.

10. The method according to claim 1, wherein in response to the detecting, by the processor, the trigger duration of the message send key, the method further comprises determining whether to send the to-be-sent object, in the message, in a normal message mode or in a secret message mode, and wherein the valid duration of the to-be-sent object, in the message, is determined in response to determining that the to-be-sent object, in the message, is to-be-sent in the secret message mode.

11. A message sending method, comprising:
    sending, by a processor, a data object to a receiver; and
    detecting, by the processor, a trigger operation of a sender on the data object, sent to the receiver, to obtain a valid duration of the data object,
    wherein the valid duration of the data object is obtained according to a trigger duration, of the trigger operation, wherein the valid duration of the data object being obtained according to the trigger duration comprises the valid duration being obtained based on a mapping between different trigger durations and different valid durations, and wherein the mapping is stored in a preset table, and
    wherein the valid duration is used for destroying the data object from the receiver when a view duration of the data object by the receiver is greater than or equal to the valid duration.

12. The method according to claim 11, wherein after acquiring the valid duration of the data object, the method further comprises:
    sending the valid duration to the receiver.

13. The method according to claim 11, wherein after acquiring the valid duration of the data object, the method further comprises:
    sending the valid duration to a message server, wherein the message server sends a destruction instruction to the receiver when the view duration of the data object by the receiver is greater than or equal to the valid duration.

14. The method according to claim 11, wherein the data object comprises one or more of the following: text, a picture, video, voice, and a file.

15. The method according to claim 11, wherein the trigger operation comprises a long press.

16. The method according to claim 11, further comprising:
    destroying the data object from the sender when the view duration of the data object by the receiver is greater than or equal to the valid duration.

17. A processing device, comprising:
    a processor; and
    a memory configured to store processor-executable instructions, wherein when executing the instructions, the processor implements:
    detecting a trigger duration of a message send key, on a message interface;
    determining a valid duration of a to-be-sent object, in a message, according to the trigger duration, wherein the determining the valid duration of the to-be-sent object, in the message, comprises determining the valid duration according to a mapping between different trigger durations and different valid durations, and wherein the mapping is stored in a preset table; and
    sending the message to a receiver, wherein the valid duration is used for destroying the message from the receiver when a view duration of the message by the receiver is greater than or equal to the valid duration.

18. The processing device according to claim 17, wherein the message is destroyed from a sender when the view duration of the message by the receiver is greater than or equal to the valid duration.

19. A processing device, comprising:
    a processor; and
    a memory configured to store processor-executable instructions, wherein when executing the instructions, the processor implements:
    sending a data object to a receiver; and
    detecting a trigger operation of a sender on the data object, sent to the receiver, to obtain a valid duration of the data object,
    wherein the valid duration of the data object is obtained according to a trigger duration, of the trigger operation, wherein the valid duration of the data object being obtained according to the trigger duration comprises the valid duration being obtained based on a mapping between different trigger durations and different valid durations, and wherein the mapping is stored in a preset table, and wherein the valid duration is used for destroying the data object from the receiver when a view duration of the data object by the receiver is greater than or equal to the valid duration.

20. A non-transitory computer-readable storage medium, having computer instructions stored thereon, wherein when executed by a processor causes the processor to execute a method of messaging, the method comprising:

detecting a trigger duration of a message send key, on a message interface;

determining a valid duration of a to-be-sent object, in a message, according to the trigger duration, wherein the determining the valid duration of the to-be-sent object, in the message, comprises determining the valid duration according to a mapping between different trigger durations and different valid durations, and wherein the mapping is stored in a preset table; and sending the message to a receiver, wherein the valid duration is used for destroying the message from the receiver when a view duration of the message by the receiver is greater than or equal to the valid duration.

21. A non-transitory computer-readable storage medium, having computer instructions stored thereon, wherein when executed by a processor causes the processor to execute a method of messaging, the method comprising:

sending a data object to a receiver; and detecting a trigger operation of a sender on the data object, sent to the receiver, to obtain a valid duration of the data object, wherein the valid duration of the data object is obtained according to a trigger duration, of the trigger operation, wherein the valid duration of the data object being obtained according to the trigger duration comprises the valid duration being obtained based on a mapping between different trigger durations and different valid durations, and wherein the mapping is stored in a preset table, and wherein the valid duration is used for destroying the data object from the receiver when a view duration of the data object by the receiver is greater than or equal to the valid duration.

* * * * *